United States Patent
Hwang et al.

(10) Patent No.: US 11,848,453 B2
(45) Date of Patent: *Dec. 19, 2023

(54) INTERMETALLIC CATALYST AND METHOD FOR PREPARING THE SAME

(71) Applicants: Hyundai Motor Company, Seoul (KR); Kia Corporation, Seoul (KR)

(72) Inventors: Jee Youn Hwang, Seoul (KR); Eunjik Lee, Gyeonggi-do (KR); Dahee Kwak, Gyeonggi-do (KR); Ji-Hoon Jang, Gyeonggi-do (KR); Songi Oh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,770

(22) Filed: Dec. 1, 2021

(65) Prior Publication Data
US 2022/0209253 A1    Jun. 30, 2022

(30) Foreign Application Priority Data
Dec. 24, 2020  (KR) .................. 10-2020-0182779

(51) Int. Cl.
*B01J 21/18* (2006.01)
*B01J 23/16* (2006.01)
(Continued)

(52) U.S. Cl.
CPC .................................. *H01M 4/926* (2013.01)

(58) Field of Classification Search
CPC ... B01J 21/18; B01J 23/16; B01J 23/20; B01J 23/22; B01J 23/26; B01J 23/34; B01J 23/40; B01J 23/42; B01J 23/44; B01J 23/46; B01J 23/54; B01J 23/60; B01J 23/626; B01J 23/64; B01J 23/6482; B01J 23/6484; B01J 23/6522; B01J 23/6562; B01J 23/72; B01J 23/74; B01J 23/745; B01J 23/75; B01J 23/755; B01J 23/80; B01J 23/835; B01J 23/84; B01J 23/847;
(Continued)

(56) References Cited

U.S. PATENT DOCUMENTS 6,417,133 B1 * 7/2002 Ebner .................. B01J 23/40 502/185
6,603,039 B1 * 8/2003 Ebner .................. B01J 23/40 502/182
(Continued)

FOREIGN PATENT DOCUMENTS

| KR | 2016-0039749 A | 4/2016 |
| KR | 101774706 B1 | 9/2017 |
| KR | 101995830 B1 | 7/2019 |

*Primary Examiner* — Cam N. Nguyen
(74) *Attorney, Agent, or Firm* — Fox Rothschild LLP

(57) ABSTRACT

Provided is a method of preparing an intermetallic catalyst which includes applying ultrasonic wave to a precursor mixture solution including a noble metal precursor, a transition metal precursor, and a carbon support having an average pore size of about 6 nm to about 15 nm and a specific surface area of about 200 m²/g to about 2000 m²/g to form alloy particles in pores of the carbon support, and annealing the alloy particles in the pores of the carbon support to form intermetallic alloy particles.

13 Claims, 19 Drawing Sheets

(51) Int. Cl.
*B01J 23/20* (2006.01)
*B01J 23/22* (2006.01)
*B01J 23/26* (2006.01)
*B01J 23/34* (2006.01)
*B01J 23/40* (2006.01)
*B01J 23/42* (2006.01)
*B01J 23/44* (2006.01)
*B01J 23/46* (2006.01)
*B01J 23/54* (2006.01)
*B01J 23/60* (2006.01)
*B01J 23/62* (2006.01)
*B01J 23/648* (2006.01)
*B01J 23/652* (2006.01)
*B01J 23/656* (2006.01)
*B01J 23/72* (2006.01)
*B01J 23/74* (2006.01)
*B01J 23/745* (2006.01)
*B01J 23/75* (2006.01)
*B01J 23/755* (2006.01)
*B01J 23/80* (2006.01)
*B01J 23/835* (2006.01)
*B01J 23/84* (2006.01)
*B01J 23/847* (2006.01)
*B01J 23/86* (2006.01)
*B01J 23/89* (2006.01)
*B01J 37/34* (2006.01)
*H01M 4/92* (2006.01)

(58) Field of Classification Search
CPC .... B01J 23/8472; B01J 23/8474; B01J 23/86;
B01J 23/89; B01J 23/8906; B01J
23/8913; B01J 23/892; B01J 23/8926;
B01J 23/8933; B01J 23/8953; B01J
23/8966; B01J 23/898; B01J 23/8986;
B01J 23/8993; B01J 37/34; H01M 4/926
USPC ............................................ 502/185, 339
See application file for complete search history.

(56) References Cited

U.S. PATENT DOCUMENTS

| | | | | |
|---|---|---|---|---|
| 6,746,508 B1* | 6/2004 | Deevi | ................... | B22F 1/054 |
| | | | | 252/62.55 |
| 6,956,005 B2* | 10/2005 | Leiber | ................... | C07F 9/3813 |
| | | | | 502/185 |
| 7,022,642 B2* | 4/2006 | Yamamoto | ............ | B82Y 30/00 |
| | | | | 502/185 |
| 7,193,107 B2* | 3/2007 | Leiber | ................... | B01J 23/56 |
| | | | | 562/17 |
| 7,205,255 B2* | 4/2007 | Yamamoto | ............ | H01M 4/921 |
| | | | | 502/185 |
| 7,226,690 B2* | 6/2007 | Sugimasa | ................ | B01J 23/40 |
| | | | | 429/525 |
| 7,235,324 B2* | 6/2007 | Sugimasa | ............ | B01J 31/1633 |
| | | | | 429/525 |
| 7,291,751 B2* | 11/2007 | Leiber | ................... | C07F 9/3813 |
| | | | | 562/17 |
| 7,968,191 B2* | 6/2011 | Hampden-Smith | .... | G01N 33/58 |
| | | | | 428/408 |
| 8,163,263 B2* | 4/2012 | Harutyunyan | ......... | B01J 37/343 |
| | | | | 977/843 |
| 8,168,561 B2* | 5/2012 | Virkar | ................... | B01J 35/008 |
| | | | | 502/336 |
| 8,227,117 B2* | 7/2012 | Hampden-Smith | .... | H01B 1/122 |
| | | | | 502/182 |
| 9,163,041 B2* | 10/2015 | Wan | ........ | B01J 23/70 |
| 9,755,243 B2* | 9/2017 | Mashio | .................. | B01J 23/42 |
| 9,873,107 B2* | 1/2018 | Hass | ................. | B01J 23/63 |
| 9,944,667 B2* | 4/2018 | Wan | ................ | B01J 23/8906 |
| 10,135,074 B2* | 11/2018 | Takahashi | ........... | H01M 4/9083 |
| 10,256,459 B1* | 4/2019 | Zhamu | ................... | H01M 4/38 |
| 10,522,844 B2* | 12/2019 | Borchtchoukova | ... | H01M 4/921 |
| 10,562,018 B2* | 2/2020 | Suzue | .................. | B01J 35/1028 |
| 10,675,611 B2* | 6/2020 | Okui | ................... | B01J 35/10 |
| 10,991,950 B2* | 4/2021 | Abruña | ................. | H01M 4/921 |
| 11,469,415 B2* | 10/2022 | Jang | ................... | H01M 4/628 |
| 11,682,772 B2* | 6/2023 | Schechter | ............ | H01M 4/8652 |
| | | | | 429/483 |
| 2002/0009626 A1* | 1/2002 | Terazono | ............ | B01J 35/0033 |
| | | | | 429/535 |
| 2012/0094199 A1* | 4/2012 | Schwab | ............... | H01M 4/926 |
| | | | | 502/313 |
| 2016/0197358 A1* | 7/2016 | Arihara | ................. | H01M 4/926 |
| | | | | 502/185 |
| 2017/0200956 A1* | 7/2017 | Nagami | ............... | H01M 4/926 |
| 2018/0006313 A1* | 1/2018 | Haas | ................... | H01M 4/921 |
| 2018/0123138 A1* | 5/2018 | Huang | ................. | H01M 12/08 |
| 2020/0280054 A1* | 9/2020 | Jang | ................... | H01M 4/625 |
| 2020/0282255 A1* | 9/2020 | Aberton | ............. | A63B 21/0724 |
| 2022/0059812 A1* | 2/2022 | Obrovac | ............. | H01M 4/1395 |

\* cited by examiner

INTERMETALLIC CATALYST AND METHOD FOR PREPARING THE SAME

CROSS-REFERENCE TO RELATED APPLICATION

This application claims priority to and the benefit of Korean Patent Application No. 10-2020-0182779 filed in the Korean Intellectual Property Office on Dec. 24, 2020, the entire contents of which are incorporated herein by reference.

TECHNICAL FIELD

The present invention relates to an intermetallic catalyst for a fuel cell and a method for preparing the same.

BACKGROUND

A fuel cell is an energy conversion device that directly converts chemical energy of a fuel into electrical energy. The fuel cell has superior efficiency compared with existing internal combustion engines, and is in the spotlight as a next-generation energy source due to its high energy density and environment-friendliness.

Polyelectrolyte fuel cells (PEMFC) and direct methanol fuel cells (DMFC) mainly operate at a low temperature of less than or equal to about 80° C., and thus an electrode catalyst is required to increase rates of oxidation and reduction reactions of the fuel cell. In particular, platinum is mainly used as an electrode catalyst for a fuel cell because it is the only catalyst capable of promoting oxidation of fuel (hydrogen or alcohol) and reduction of oxygen from room temperature to about 100° C. However, since platinum reserves are limited and very expensive, it is very important to reduce the amount of platinum used or maximize catalytic activity per unit mass for commercialization of fuel cells.

In order to achieve the above object, studies on platinum alloy catalysts have been conducted. Platinum alloy catalysts theoretically have higher activity and stability than pure platinum catalysts due to electrical and structural characteristics of the particle surface, and thus are attracting attention as a reliable alternative to fuel cell electrode materials. Among them, the regularly arranged alloy catalyst structure (intermetallic structure) is in the spotlight because it shows high durability when applied to fuel cells because heterogeneous alloy metals do not melt out.

However, during the preparation process of the intermetallic alloy, a high-temperature annealing process is essential, and in this process, agglomeration of metal particles occurs. Conventionally, an inorganic material or a carbon coating layer has been introduced to control the particle size, but this method has low efficiency in terms of economy and resource recovery.

In addition, when a commercially available carbon support is used in the preparation of the intermetallic alloy catalyst, the sizes of the intermetallic catalyst particles are not uniform, and the catalyst particles may be agglomerated during the synthesis process.

SUMMARY OF THE INVENTION

In one preferred aspect, provided is a method of preparing an intermetallic catalyst capable of controlling particle sizes in various sizes during high-temperature annealing required to form intermetallic alloy particles, and simplifying a process and reducing cost compared with an existing process.

In further preferred aspect, provided is an intermetallic catalyst prepared by using the method of preparing an intermetallic catalyst according to an embodiment.

In an aspect, a method of preparing an intermetallic catalyst includes forming alloy particles in pores of a carbon support having an average pore size of about 6 nm to about 15 nm and a specific surface area of about 200 m$^2$/g to about 2000 m$^2$/g, and forming intermetallic alloy particles by annealing the alloy particles in the pores of the carbon support.

The term "intermetallic compound" or "intermetallic alloy" as used herein generally refers to a metal compound or metal alloy compound that has a specific chemical formula formed by ionic or covalent bonding and includes the metals (e.g., metal atoms) fixed or very limited in variability. In certain preferred aspects, an intermetallic compound or intermetallic alloy may forms a specific crystal structure, for example, by placing a specific single element in the specific position in the crystal structure such that those intermetallic compounds can have high melting point, or resistance to high temperatures but low ductility. In certain aspects, such property can be distinct from conventional (or non-intermetallic) metal alloys, which may be formed from disordered solid solution of one or more metallic elements, and do not have a specific chemical formula or crystal structure. Exemplary intermetallic compound or alloy may include one or more metals selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), and an alloy thereof. The intermetallic alloy particles may have a size of about 3.0 nm to about 7.0 nm.

The method may further include preparing a second carbon support having an average pore size of about 8 nm to about 12 nm and a specific surface area of about 500 m$^2$/g to about 700 m$^2$/g, or a third carbon support having an average pore size of about 12 nm to about 15 nm and a specific surface area of about 200 m$^2$/g to about 500 m$^2$/g, by annealing a first carbon support having an average pore size of about 6 nm to about 8 nm and a specific surface area of about 700 m$^2$/g to about 2000 m$^2$/g at about 800° C. to about 1200° C. for about 2 hours to about 10 hours.

The noble metal precursor may include one or more selected from the group consisting of platinum (Pt), ruthenium (Ru), osmium (Os), iridium (Ir), palladium (Pd), and an alloy thereof.

The transition metal precursor may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), and an alloy thereof.

The carbon support may include one or more selected from the group consisting of carbon black, graphite, a carbon nanofiber, a graphitized carbon nanofiber, a carbon nanotube, a carbon nanohorn, and a carbon nanowire.

The ultrasonic wave may be applied for about 20 minutes to about 4 hours at an output of about 125 W to about 200 W based on 100 mL of the precursor mixture solution.

The annealing may be performed at a temperature of about 700° C. to about 1200° C. for about 0.5 hours to about 16 hours.

The annealing may be performed under a gas atmosphere including hydrogen ($H_2$), and the gas may include hydrogen ($H_2$) in an amount of about 1 volume % to about 10 volume % based on the total volume of the gas.

In an aspect, an intermetallic catalyst includes a carbon support having an average pore size of about 6 nm to about 15 nm and a specific surface area of about 200 $m^2/g$ to about 2000 $m^2/g$, and intermetallic alloy particles of a transition metal and a noble metal wherein the intermetallic alloy particles are present in the pores of the carbon support and has a particle diameter of about 3.0 nm to about 7.0 nm.

The carbon support may include a first carbon support having an average pore size of about 6 nm to about 8 nm and a specific surface area may be about 700 $m^2/g$ to about 2000 $m^2/g$, and the intermetallic alloy particles in the pores of the first carbon support may have a size of about 3.0 nm to about 4.0 nm.

The carbon support may include a second carbon support having an average pore size of about 8 nm to about 12 nm and a specific surface area of about 500 $m^2/g$ to about 700 $m^2/g$ and the intermetallic alloy particles in the pores of the carbon support may have a size of about 4.0 nm to about 5.0 nm.

The carbon support may include a third carbon support having an average pore size of about 12 nm to about 15 nm and a specific surface area of about 200 $m^2/g$ to about 500 $m^2/g$ and the intermetallic alloy particles in the pores of the carbon support may have a size of about 6.0 nm to about 7.0 nm.

In the method of preparing an intermetallic catalyst according to various exemplary embodiments described herein, during high-temperature annealing required to form intermetallic alloy particles, the particle size may be controlled in various sizes, and process simplification and cost reduction may be possible compared with existing processes.

Other aspects of the invention are disclosed infra.

DETAILED DESCRIPTION

Figure 1:
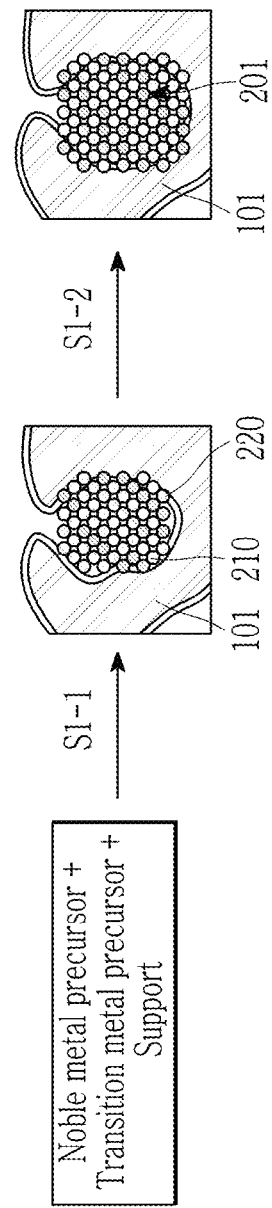
FIG. 1 shows an exemplary method of preparing an exemplary intermetallic catalyst according to an exemplary embodiment of the present invention.

The advantages and features of the present disclosure and the methods for accomplishing the same will be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined. In addition, unless explicitly described to the contrary, the word "comprise", and variations such as "comprises" or "comprising," will be understood to imply the inclusion of stated elements but not the exclusion of any other elements.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Further, the singular includes the plural unless mentioned otherwise.

A method of preparing an intermetallic catalyst includes applying ultrasonic wave to a precursor mixture solution including a noble metal precursor, a transition metal precursor, and a carbon support to form alloy particles in pores of the carbon support and annealing the alloy particles in the pores of the carbon support to form intermetallic alloy particles.

FIG. 1 shows an exemplary method of preparing an intermetallic catalyst according to an embodiment. Referring to FIG. 1, a method of preparing an intermetallic catalyst is described.

The ultrasonic wave may be applied to a precursor mixture solution including the noble metal precursor, the transition metal precursor, and the carbon support 101 to form alloy particles 202 in the pores of the carbon support 101 (S1-1).

High frequency oscillation of the ultrasonic wave generates bubbles in a cavity, resulting in oscillatory growth, and when the oscillation finally reaches a certain scale, the cavity explodes. This series of processes caused by the ultrasonic irradiation is called to be "an acoustics cavitation mechanism."

The cavity explosion occurring in the final stage of the acoustics cavitation mechanism may cause a huge amount of thermal energy up to about 5000 K, which is dissipated in a very short time of about $10^{-6}$ seconds.

When reactants in the chemical reaction combined with ultrasonic wave are at least two materials having different vapor pressures, the at least two reactants have different evaporation rates to bubbles by a high frequency oscillation of ultrasonic wave, so that structural and electrochemical characteristics of the reaction resultants may be controlled using the same. For example, when the noble metal precursor and the transition metal precursor are used as reactants and ultrasonic wave is applied, the alloy particles 202 may be formed in the pores of the carbon support 101.

The ultrasonic treatment may be performed for about 20 minutes to about 4 hours at an output of about 125 W to about 200 W based on 100 mL of the precursor mixture solution. When the output of the ultrasonic wave is less than about 125 W or for a time of less than about 20 minutes, metal ions may be insufficiently reduced. When the output of the ultrasonic wave is greater than about 200 W or for greater than about 4 hours, they may be grown to an unnecessary particle size.

During ultrasonic treatment, the temperature may be in the range of about 140° C. to about 170° C. During ultrasonic treatment, when the temperature is less than about 140° C., metal ions may be insufficiently reduced, and when it is greater than about 170° C., it may be grown into unnecessary particle sizes.

The noble metal 210 may include one or more selected from the group consisting of platinum (Pt), ruthenium (Ru), osmium (Os), iridium (Ir), palladium (Pd), and an alloy thereof. For example, the noble metal precursor may be in a form of a salt of the noble metal 210, and may include a nitrate, a sulfate, an acetate, a chloride, an oxide, or a combination thereof. For example, the noble metal precursor may be an acetylacetonate of the noble metal 210, a hexafluoroacetylacetonate of the noble metal 210, or a pentafluoroacetylacetonate of the noble metal 210.

The transition metal 220 may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), and an alloy thereof. The transition metal precursor may be in the form of salts of the transition metal 220, and may include, for example, a nitrate, a sulfate, an acetate, a chloride, an oxide, or a combination thereof. For example, the transition metal precursor may be an acetylacetonate of the transition metal 220, a hexafluoroacetylacetonate of the transition metal 220, or a pentafluoroacetylacetonate of the transition metal 220.

As these noble metal precursors and transition metal precursors are rapidly volatilized by a high vapor pressure and are rapidly trapped in the cavity by ultrasonic wave, the alloy particles 202 may be formed in the pores of the carbon support 101 by ultrasonic treatment.

The carbon support 101 may include, for example, carbon black, graphite, a carbon nanofiber, a graphitized carbon nanofiber, a carbon nanotube, a carbon nanohorn, a carbon nanowire, or a combination thereof. The carbon black may suitably include denka black, ketjen black, acetylene black, channel black, furnace black, lamp black, thermal black, or a combination thereof.

Moreover, in order to control the size of the intermetallic alloy particles 201 to a size of several nanometers by forming the alloy particles 202 in the pores of the carbon support 101 in the ultrasonic treatment process, and suppressing the growth of the alloy particles 202 in the subsequent annealing process, a carbon support 101 having an average pore size of 6 nm to 15 nm and a specific surface area of 200 $m^2/g$ to 2000 $m^2/g$ may suitably be used.

When such a carbon support 101 is used, intermetallic alloy particles 201 having a particle size of about 3.0 nm to about 7.0 nm may be prepared. When the average pore size and specific surface area of the carbon support 101 are out of the above ranges, the intermetallic alloy particles 201 having a particle size of about 3.0 nm to about 7.0 nm in the preparation of the intermetallic alloy particles 201 by the ultrasonic method may not be prepared.

In addition, in the method of preparing an intermetallic catalyst according to an embodiment, the intermetallic alloy particles 201 may be prepared in various sizes by adjusting the average pore size and specific surface area of the carbon support 101.

For example, when using a first carbon support 101 having an average pore size of about 6 nm to about 8 nm and a specific surface area of about 700 $m^2/g$ to about 2000 $m^2/g$, an intermetallic catalyst having a particle size of about 3.0 nm to about 4.0 nm may be prepared.

As another example, when using a second carbon support 101 having an average pore size of about 8 nm to about 12 nm and a specific surface area of about 500 $m^2/g$ to about 700 $m^2/g$, an intermetallic catalyst having a particle size of about 4.0 nm to about 5.0 nm may be prepared.

The second carbon support 101 having an average pore size of about 8 nm to about 12 nm and a specific surface area of about 500 $m^2/g$ to about 700 $m^2/g$ may be prepared by annealing the first carbon support 101 having an average pore size of about 6 nm to about 8 nm and a specific surface area of about 700 $m^2/g$ to about 2000 $m^2/g$. For example, the annealing temperature and time may be adjusted within the range of about 800° C. to about 1000° C. for about 2 hours to about 10 hours. When the annealing is performed at less than about 800° C. or for less than about 2 hours, the intermetallic structure may not be formed, but when the annealing is performed at greater than about 1000° C. or for greater than about 10 hours, the particle size may be excessively increased.

In addition, for another example, a third carbon support 101 having an average pore size of about 12 nm to about 15 nm and a specific surface area of about 200 m$^2$/g to about 500 m$^2$/g, an intermetallic catalyst having a particle size of about 6.0 nm to about 7.0 nm may be prepared.

The third carbon support 101 having an average pore size of about 12 nm to about 15 nm and a specific surface area of about 200 m$^2$/g to about 500 m$^2$/g may be prepared by annealing a carbon support 101 having an average pore size of about 6 nm to about 8 nm and a specific surface area of about 700 m$^2$/g to about 2000 m$^2$/g. For example, the annealing temperature and time may be adjusted within the range of about 800° C. to about 1000° C. for about 2 hours to about 10 hours. When the annealing temperature and time are lower than about 800° C. or less than about 2 hours, the intermetallic structure may not be formed, but when the annealing temperature and time are greater than about 1000° C. or greater than about 10 hours, the particle size may be excessively increased.

The precursor mixture solution may further include a reducing solvent.

The reducing solvent may include an organic material having no moisture and oxygen source, for example, a solvent having a reducing power at a temperature of greater than or equal to about 70° C. or a solvent having a reducing power at a temperature of about 70° C. to about 400° C. Specifically, the reducing solvent includes ethylene glycol, di-ethylene glycol, tri-ethylene glycol, poly-ethylene glycol, or a combination thereof.

The reducing solvent may reduce reactants of a noble metal precursor and a transition metal precursor in a cavity formed by the ultrasonic treatment, and also, maintaining a high boiling point to create an external liquid environment for generating and extinguishing a cavity.

The alloy particles 202 may be annealed in the pores of the carbon support 101 to form intermetallic alloy particles 201 (S1-2).

Through the annealing process, an alloying degree of the noble metal 210 and the transition metal 220 is increased, forming the intermetallic alloy particles 201.

Since the alloy particles 202 are suppressed from growth by the pore size of the carbon support 101, the intermetallic alloy particles 201 are controlled to have a size of several nanometers during the annealing process, and accordingly, a high temperature annealing may be sufficiently performed to increase the alloying degree and thus enhance composition uniformity and catalyst activity.

The annealing may be performed at a temperature of about 700° C. to about 1200° C. for about 0.5 hours to about 16 hours. When the annealing temperature is less than about 700° C. or the annealing time is less than about 0.5 hours, an increase in catalytic activity may be limited due to the lack of improvement in the regular arrangement of metal atoms in the alloy. When the annealing temperature is greater than about 1200° C. or the annealing time is greater than about 16 hours, an effect of inhibiting particle size growth may decrease, resulting in decreased catalytic activity.

The annealing process may be performed in an inert gas atmosphere such as argon, nitrogen, or a mixed gas atmosphere of air and hydrogen (H$_2$), and an atmosphere including about 1 volume % to about 10 volume % of hydrogen based on a total volume of the mixed gas.

In addition, the annealed intermetallic alloy particles 201 may be acid-treated on the surface to remove impurities and then, washed to remove the residual acid.

The acid treatment may remove (elute) the protective layer 230 remaining on the surfaces of the prepared intermetallic alloy particles 201, impurities and the transition metal 220 remaining on the surface, and the like.

For example, the prepared intermetallic alloy particles 201 may be put in an acid aqueous solution and refluxed for a certain time (e.g., 3 hours) at a certain temperature (e.g., 80° C.). Meanwhile, the acid aqueous solution used may include, for example, sulfuric acid (H$_2$SO$_4$), nitric acid (HNO$_3$), hydrochloric acid (HCl), acetic acid (CH$_3$COOH), or a combination thereof.

The residual acid may be removed by performing filtering and drying processes together. In other words, the prepared intermetallic alloy particles 201 are filtered and several times washed with distilled water to remove the residual acid solution. In addition, in order to maintain the surfaces of the intermetallic alloy particles 201 clean, the intermetallic alloy particles 201 may be dried in a dry oven filled with an inert gas or a vacuum oven.

Figure 2:
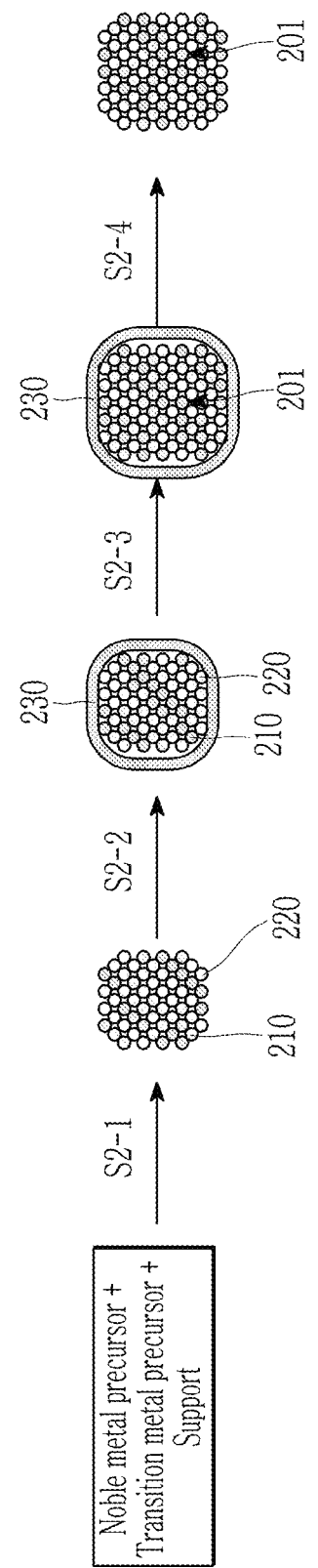
FIG. 2 shows a method of preparing an intermetallic catalyst according to a conventional method.

FIG. 2 shows a method of preparing an intermetallic catalyst according to a conventional method.

As shown in FIG. 2, a reducing agent is added to a precursor solution including a carbon support, a noble metal precursor, and a transition metal precursor, so that a noble metal 210 and a transition metal 220 may be supported on the carbon support (not shown) (S2-1).

Subsequently, on the surface of the carbon support supported by the noble metal 210 and the transition metal 220, a protective layer 230 is coated (S2-2). By annealing it after coating the protective layer 230, growth of the intermetallic alloy particles 201 may be suppressed during the annealing process.

Then, the carbon support supported by the noble metal 210 and the transition metal 220 may be annealed (S2-3) to increase the alloying degree of the noble metal 210 and the transition metal 220 and thus form the intermetallic alloy particles 201.

Then, an acid treatment is performed to remove the protective layer 230 remaining on the surfaces of the intermetallic active particles 201 (S2-4).

In other words, according to a conventional method, a four-step process is required to suppress growth of an intermetallic catalyst, but according to one embodiment, the method of preparing an intermetallic catalyst needs only two steps of forming the alloy particles 202 inside pores of the carbon support 101 by using ultrasonic waves (S1-1) and performing an annealing to control sizes of the intermetallic alloy particles 201 (S1-2).

The intermetallic catalyst according to an exemplary embodiment includes a carbon support 101 and intermetallic alloy particles 201 of a transition metal 220 and a noble metal 210 in the pores of the carbon support 101.

As the intermetallic catalyst is prepared by the method of preparing an intermetallic catalyst according to an embodiment, the carbon support 101 may have an average pore size of about 6 nm to about 15 nm and a specific surface area of about 200 m$^2$/g to about 2000 m$^2$/g, and the intermetallic alloy particles 201 may have a particle size of about 3.0 nm to about 7.0 nm.

For example, the first carbon support 101 may have an the average pore size of about 6 nm to about 8 nm and a specific surface area of about 700 m$^2$/g to about 2000 m$^2$/g, and the intermetallic alloy particles 201 in the pores of the carbon support 101 may have a size of about 3.0 nm to about 4.0 nm.

As another example, the second carbon support 101 has an average pore size of about 8 nm to about 12 nm and a specific surface area of about 500 m²/g to 700 m²/g, and the intermetallic alloy particles 201 in the pores of the carbon support 101 may have a size of about 4.0 nm to about 5.0 nm.

As another example, the third carbon support 101 may have an average pore size of about 12 nm to about 15 nm and a specific surface area of about 200 m²/g to about 500 m²/g, and the intermetallic alloy particles in the pores of the carbon support 101 may have a size of 201 of about 6.0 nm to about 7.0 nm.

In another aspect, an electrode for a fuel cell includes the intermetallic catalyst and an ionomer mixed with the intermetallic catalyst as described herein.

Further provided is a membrane-electrode assembly including an anode and a cathode facing each other, and an ion exchange membrane between the anode and cathode, wherein the anode, the cathode, or both are the aforementioned electrodes.

Also provided is a fuel cell including the aforementioned membrane-electrode assembly.

The electrode, the membrane-electrode assembly, and the fuel cell are the same as those of the general electrode, the membrane-electrode assembly, and the fuel cell, except that the aforementioned intermetallic catalyst is included, so detailed descriptions thereof will be omitted.

EXAMPLE

Hereinafter, specific examples of the invention are described. However, the examples described below are for illustrative purposes only, and the scope of the invention is not limited thereto.

Preparation Example: Preparation of Intermetallic Catalyst

Example 1

A carbon support having an average pore size of 7 nm and a specific surface area of 1000 m²/g was prepared (product name: KB300J, manufacturer: Lion).

Pt(acac)$_2$, Fe(acac)$_3$, and the carbon support were added to ethylene glycol to prepare a precursor mixture solution, 100 mL of the precursor mixture solution was irradiated with ultrasonic wave by using tip type ultrasonic wave (Sonic and Materials, model VC-500, amplitude 30%, 13 mm solidprobe, 20 kHz) under an argon atmosphere at output of 150 W for 3 hours to form alloy particles in the pores of the carbon support.

At this time, the addition amounts of the noble metal precursor and the transition metal precursor were adjusted so that an atomic ratio of the noble metal and the transition metal may be 2:3.

The prepared alloy particles were annealed at a temperature of 800° C. for 2 hours in an atmosphere of 4% hydrogen and 96% air to form intermetallic alloy particles. The prepared intermetallic alloy particles were washed with ethanol, purified water, and acid.

Example 2

An intermetallic catalyst was prepared according to the same method as Example 1 except that a carbon support prepared by annealing the carbon support of Example 1 at a temperature of 1500° C. for 2 hours and having an average pore size of 10 nm and a specific surface area of 600 m²/g was used.

Example 3

An intermetallic catalyst was prepared according to the same method as Example 1 except that a carbon support prepared by annealing the carbon support of Example 1 at a temperature of 2000° C. for 2 hours and having an average pore size of 13 nm and a specific surface area of 300 m²/g was used.

Evaluation Method: Evaluation of Fuel Cell Performance of Intermetallic Catalyst Each prepared intermetallic catalyst (40 wt %) was dispersed in an n-propanol solvent at an ionomer and carbon ratio (I/C) of 0.6 to prepare slurry.

The slurry was respectively coated on a releasing paper to manufacture a cathode and an anode (the cathode: Pt loading of 0.1 mg/cm², the anode: Pt loading of 0.025 mg/cm²) and interposing a Nafion membrane between the cathode and the anode to manufacture a membrane electrode assembly (MEA).

The manufactured MEA was connected to a fuel cell-evaluating equipment and then, evaluated at a temperature of 65° C. under a bar pressure of 1 bar with air of 2500 sccm and H$_2$ of 350 sccm.

In addition, a durability acceleration evaluation (AST 5k) of the carbon supports was performed under conditions of cyclic voltammetry of 1.0 V to 1.5 V and 5000 cycles.

Experimental Example 1: Measurement of Particle Size

Sizes of the alloy particles and the intermetallic alloy particles according to Examples 1 to 3 were measured, and the results are shown in Table 1.

TABLE 1

| | Particle sizes of alloy particles (After ultrasonic treatment) | Particle sizes of intermetallic alloy particle (After annealing) |
|---|---|---|
| Example 1 | 2.09 nm | 3.34 nm |
| Example 2 | 1.60 nm | 4.10 nm |
| Example 3 | 2.15 nm | 6.82 nm |

According to the sizes of the alloy particles in Table 1, when an alloy catalyst was prepared by using ultrasonic wave, the alloy particle sizes were formed to be 2 nm or so, regardless of the pores and the specific surface areas of the carbon support.

Subsequently, when the alloy particles were annealed under an atmosphere of 4% of hydrogen and 96% of air at a high temperature of 800° C. for 2 hours in order to transform them into an intermetallic structure, the sizes of the alloy particles were increased but controlled by the pores and the specific surface area of the carbon support.

Example 2: Analysis of Intermetallic Catalyst Prepared in Example 1

Figure 3:
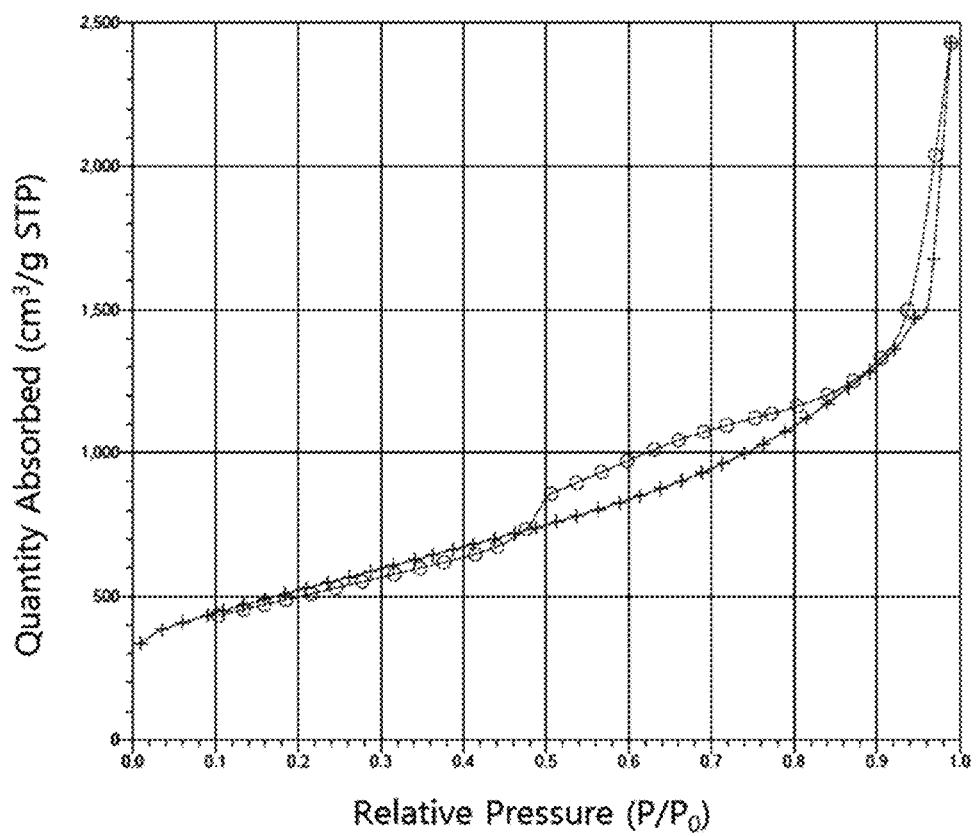
FIG. 3 shows an isotherm linear plot of the carbon support used in Example 1.

The specific surface area and the average pore size of the carbon support used in Example 1 were measured through Isotherm Linear Plot, and the results are shown in FIG. 3.

Figure 4:
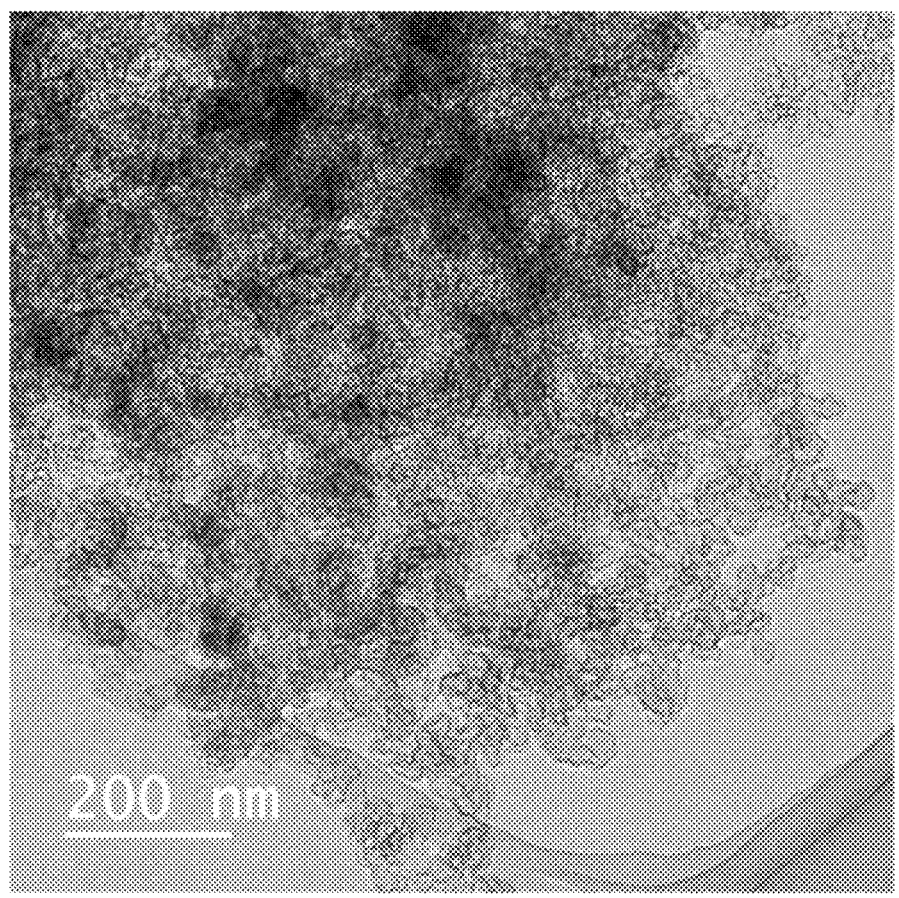
FIG. 4 shows a transmission electron micrograph (TEM) image of the carbon support used in Example 1.

In addition, a transmission electron microscope photograph (TEM) of the carbon support used in Example 1 is shown in FIG. 4.

As shown in FIGS. 3 and 4, the carbon support used in Example 1 had a specific surface area of 1819 m²/g and an average pore diameter of 8.02 nm.

Figure 5:
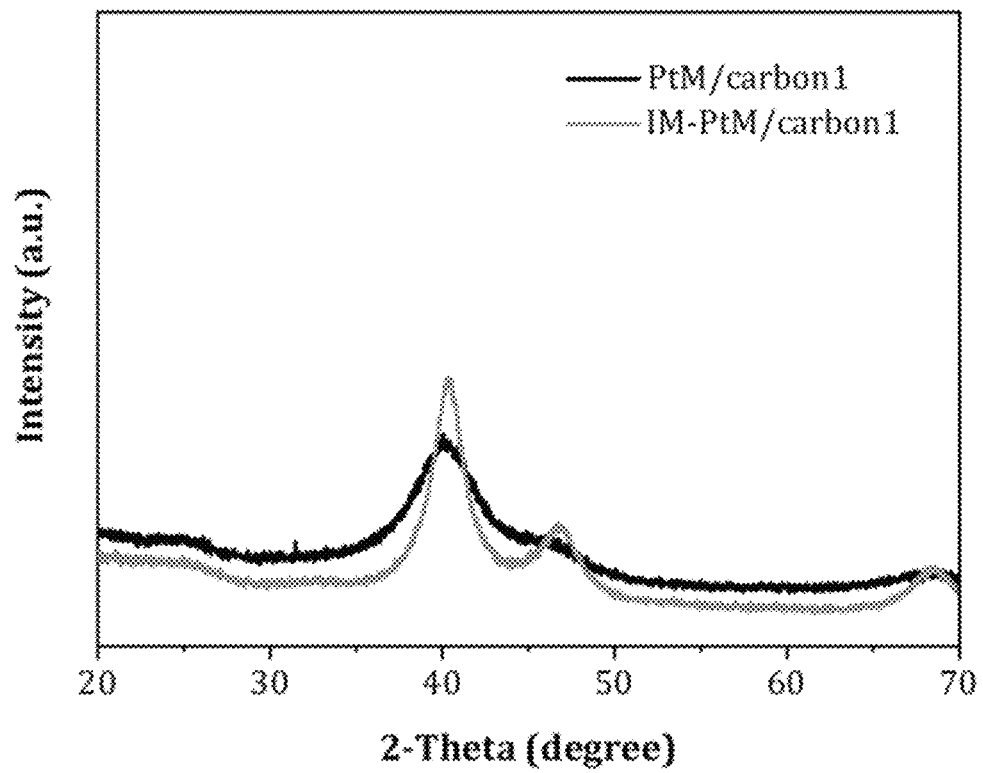
FIG. 5 shows a graph showing in-situ XRD analysis results of exemplary alloy particles and exemplary intermetallic alloy particles prepared in Example 1.

The alloy particles and the intermetallic alloy particles manufactured in Example 1 were in-situ XRD-analyzed, and the results are shown in FIG. 5.

Figure 6:
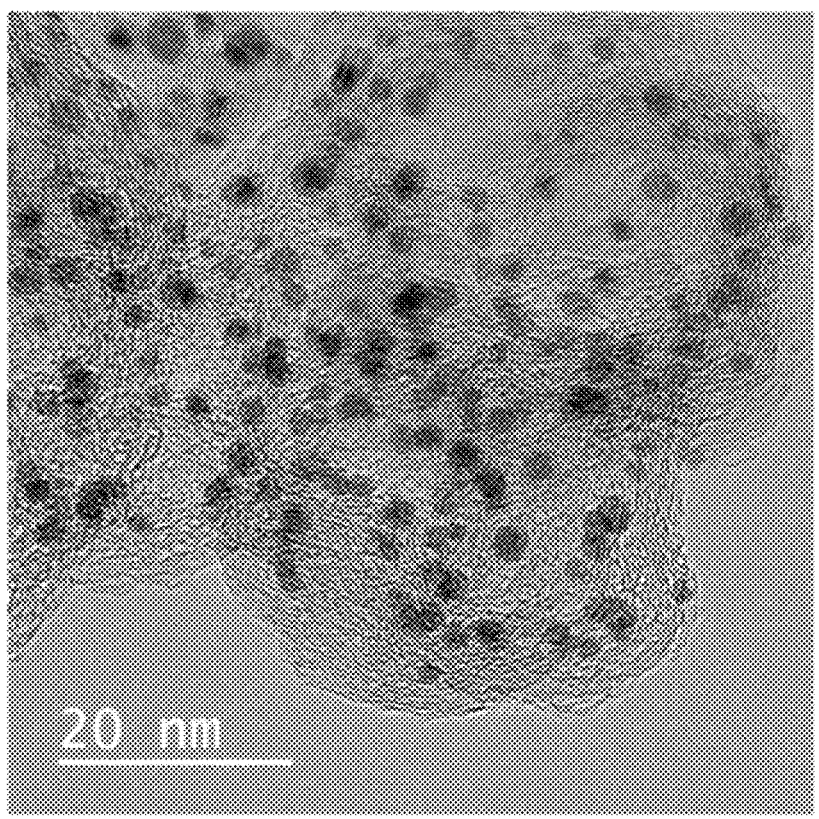
FIG. 6 shows a transmission electron micrograph (TEM) image of the exemplary intermetallic alloy particles prepared in Example 1.

In addition, a transmission electron microscope photograph (TEM) of the intermetallic alloy particles according to Example 1 is shown in FIG. 6.

As shown in FIGS. 5 and 6, the alloy particles formed by using a carbon support having a specific surface area of 1819 m²/g and an average pore diameter of 8.02 nm had a size of 2.09 nm. Then, the intermetallic alloy particles obtained through an annealing process under an atmosphere of 4% of hydrogen and 96% of air at a high temperature of 800° C. for 2 hours in order to transform the alloy particles into an intermetallic structure maintained a size of 3.34 nm.

Figure 7:
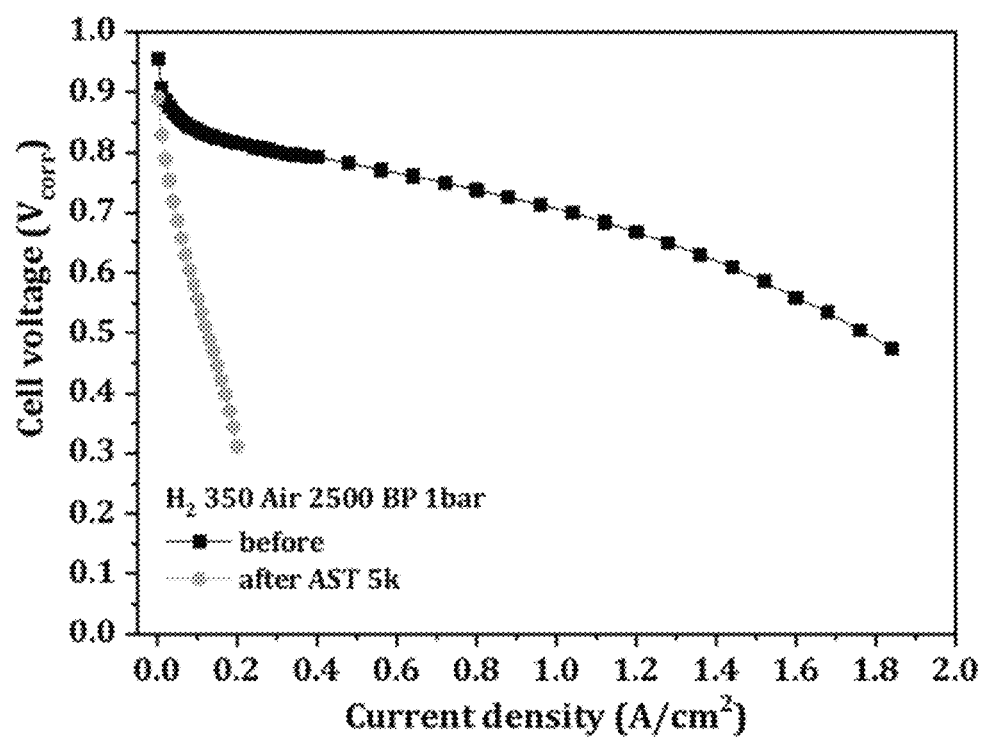
FIGS. 7 and 8 shows graphs showing results of evaluating fuel cell performance of the exemplary intermetallic catalyst prepared in Example 1.
Figure 8:
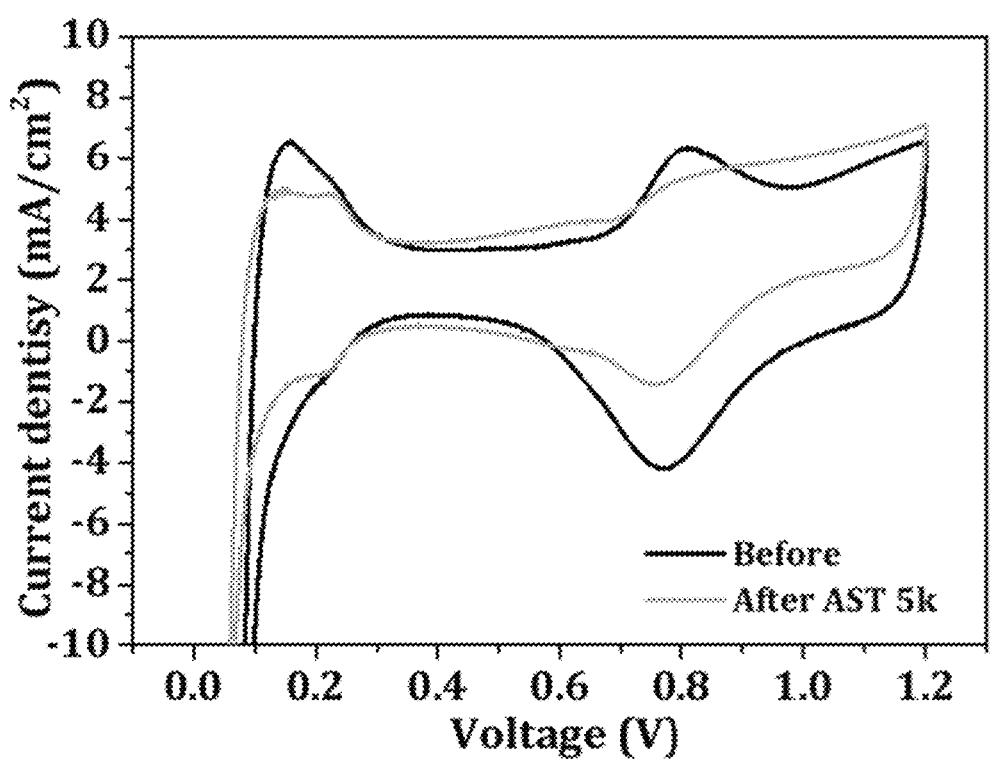

In addition, the intermetallic catalyst according to Example 1 was evaluated with respect to fuel cell performance, and the results are shown in FIGS. 7 and 8 and summarized in Table 2.

TABLE 2

| $H_2$ 350 Air 2500 (BP 1 bar) | ECSA $m^2/g_{Pt}$ | Current density @0.8 V (A/cm²) | Current density @0.7 V (A/cm²) | Current density @0.6 V (A/cm²) | HFR (mΩ · cm²) | Cell voltage @1.5 A/cm² (V) |
|---|---|---|---|---|---|---|
| Before | 39.1 | 0.406 | 1.04 | 1.47 | 67.4 | 0.590 |
| After AST 5k | 22.8 | 0.016 | 0.045 | 0.080 | 124.6 | 0 |
| Retention | 58.3% | — | — | — | — | Δ 590 mV |

As shown in FIGS. 7 and 8 and Table 2, when the intermetallic catalyst having a size of 3 nm to 4 nm was applied to a fuel cell, excellent ECSA of 39.1 m²/$g_{Pt}$ as initial performance was obtained. However, the initial performance was excellent, but as a result of durability performance of the carbon support, the performance deteriorated.

Example 3: Analysis of Intermetallic Catalyst Prepared in Example 2

Figure 9:
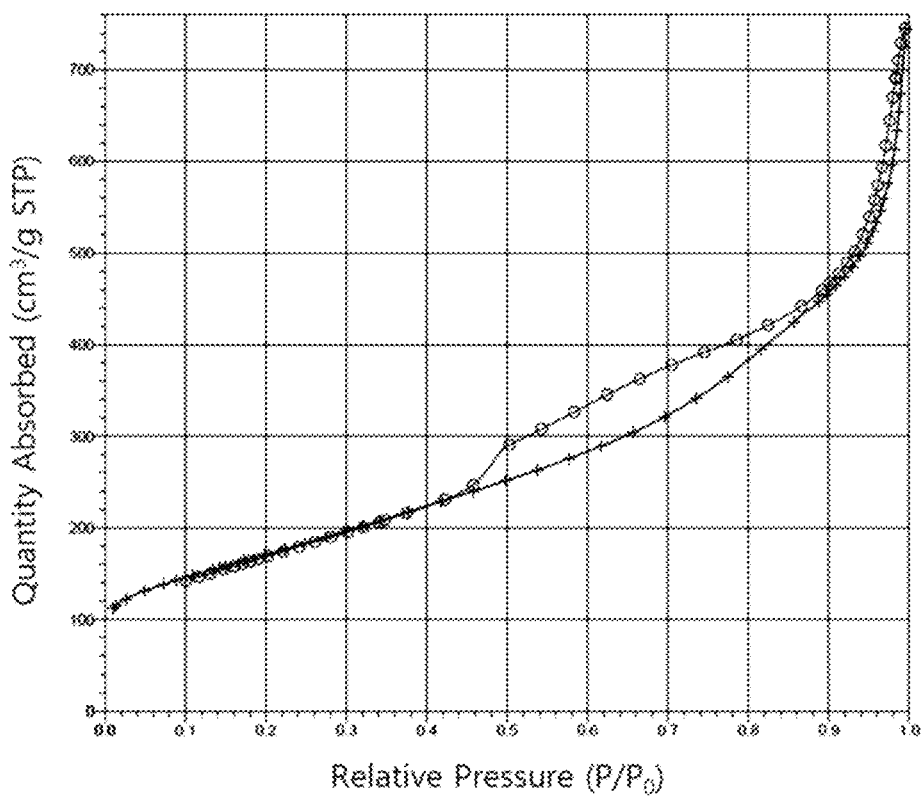
FIG. 9 shows an isotherm linear plot of an exemplary carbon support used in Example 2.

The specific surface area and the average pore size of the carbon support used in Example 2 were measured through Isotherm Linear Plot, and the results are shown in FIG. 9.

Figure 10:
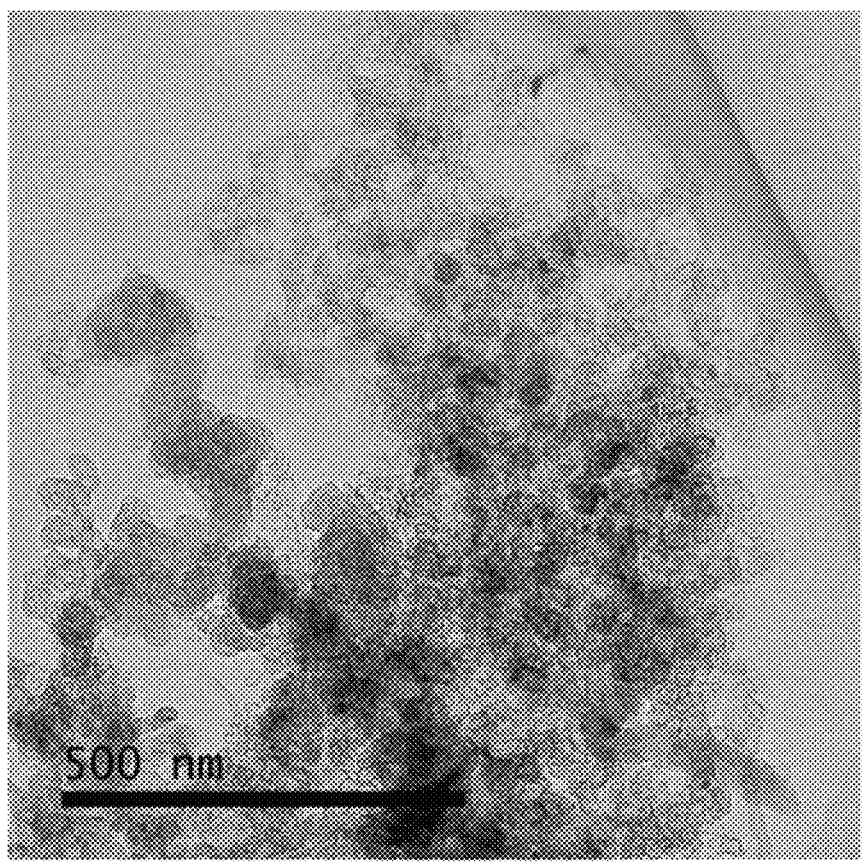
FIG. 10 shows a transmission electron micrograph (TEM) image of the exemplary carbon support used in Example 2.

In addition, a transmission electron microscope photograph (TEM) of the carbon support used in Example 2 is shown in FIG. 10.

As shown in FIGS. 9 and 10, the carbon support used in Example 2 had a specific surface area of 608.1 m²/g and an average pore diameter of 8.35 nm.

Figure 11:
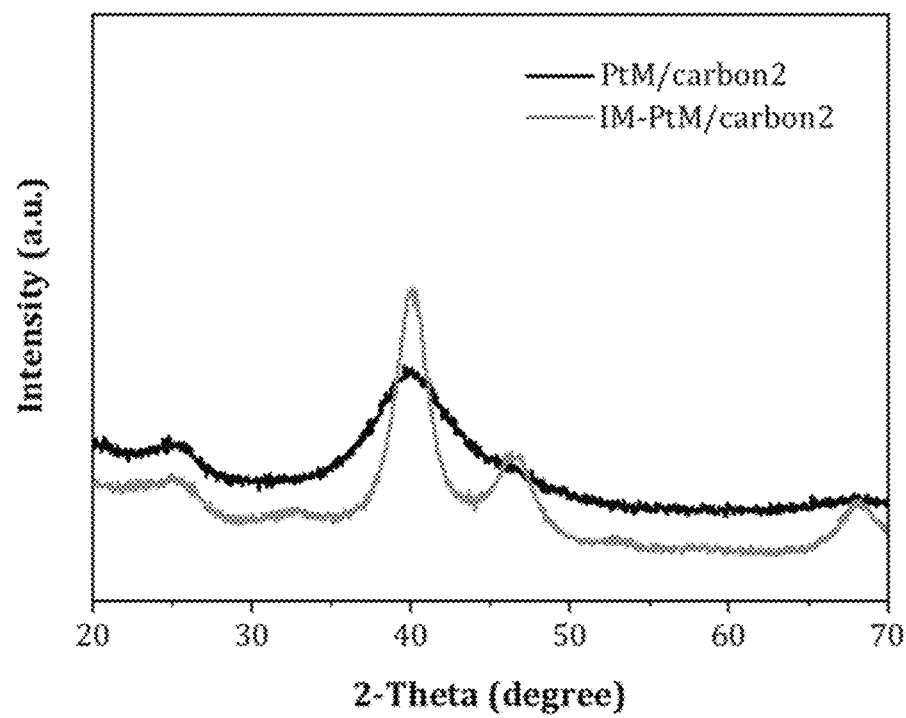
FIG. 11 shows a graph showing in-situ XRD analysis results of exemplary alloy particles and exemplary intermetallic alloy particles prepared in Example 2.

The alloy particles and intermetallic alloy particles prepared in Example 2 were in-situ XRD analyzed, and the results are shown in FIG. 11.

As shown in FIG. 11, the alloy particles prepared by using a carbon support having a specific surface area of 608.1 m²/g and an average pore diameter of 8.35 nm had a size of 1.60 nm. Subsequently, when annealed to transform the alloy particles into an intermetallic structure under an atmosphere of 4% of hydrogen and 96% of air at a high temperature of 800° C. for 2 hours, the intermetallic alloy particles obtained therefrom had a size of 4.10 nm.

Figure 12:
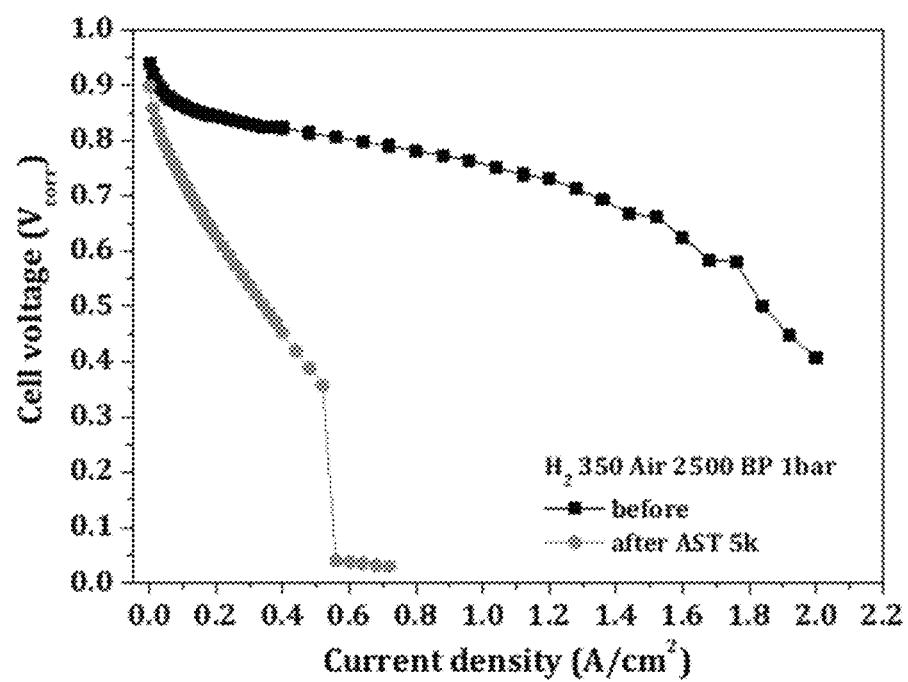
FIGS. 12 and 13 are graphs showing results of evaluating fuel cell performance of the exemplary intermetallic catalyst prepared in Example 2.
Figure 13:
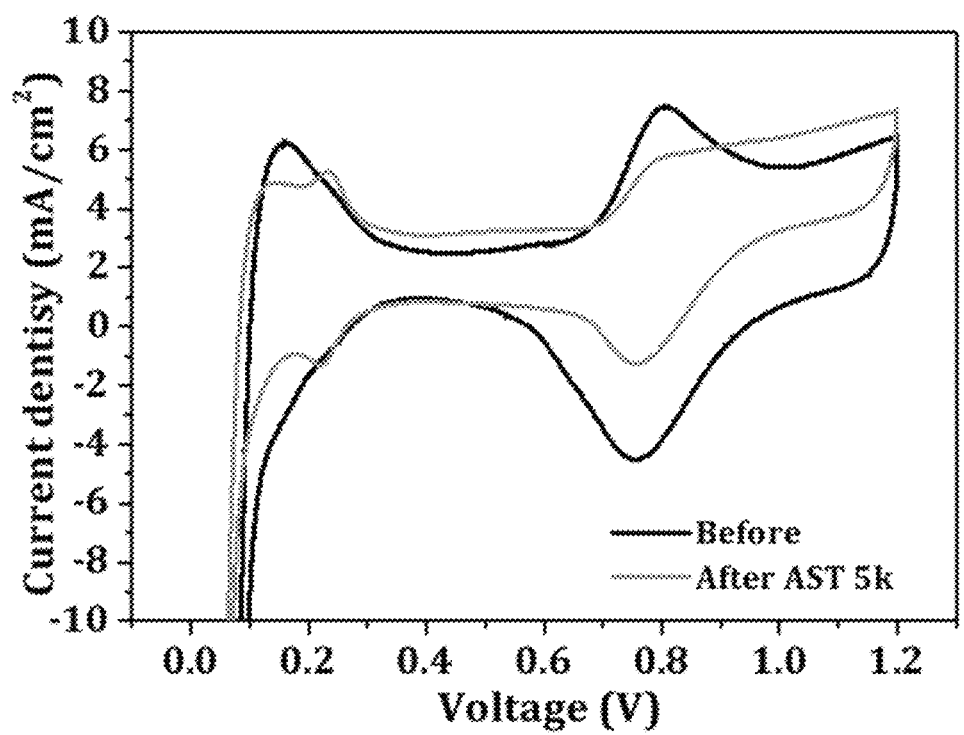

In addition, fuel cell performance of the intermetallic catalyst of Example 2 was evaluated, and the results are shown in FIGS. 12 and 13 and summarized in Table 3.

As shown in FIGS. 12 and 13 and Table 3, when the intermetallic catalyst having a size of 4 nm to 5 nm was applied to a fuel cell, excellent ECSA of 37.8 m²/$g_{Pt}$ as initial performance was obtained. However, this ECSA decreased, compared with ECSA of 39.1 m²/$g_{Pt}$ of the intermetallic catalyst having a size of 3 nm to 4 nm. In other words, the smaller a catalyst particle size was, the higher ECSA was.

Example 4: Analysis of Intermetallic Catalyst Prepared in Example 3

Figure 14:
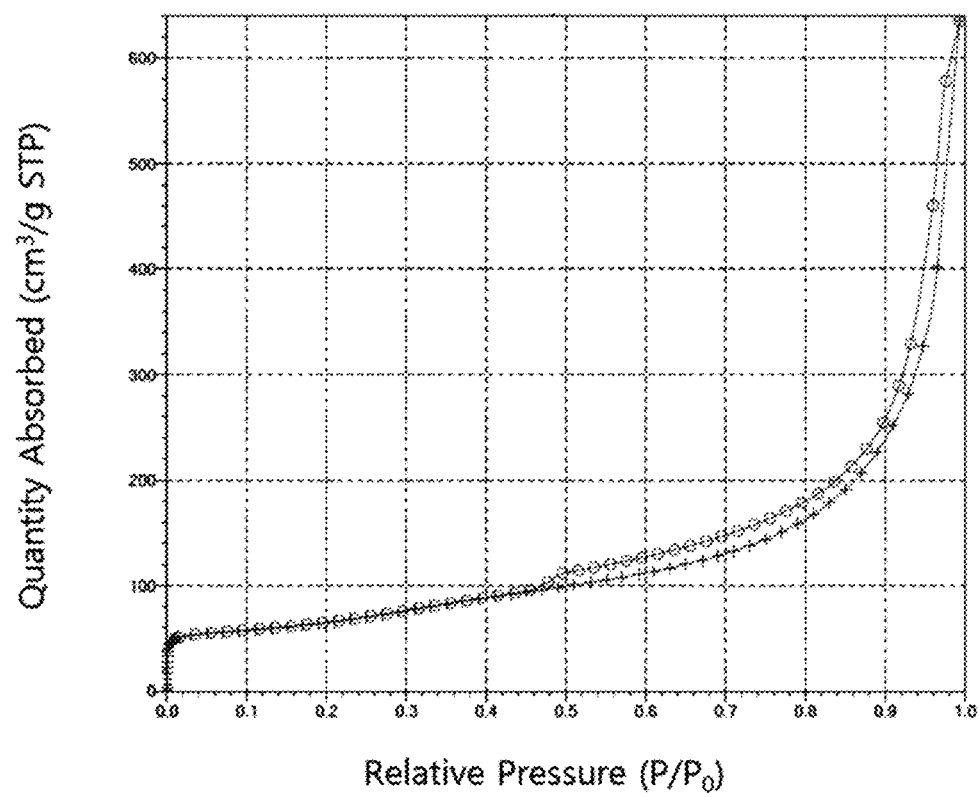
FIG. 14 shows an isotherm linear plot of an exemplary carbon support used in Example 3.

The specific surface area and the average pore size of the carbon support used in Example 3 were measured through Isotherm Linear Plot, and the results are shown in FIG. 14.

Figure 15:
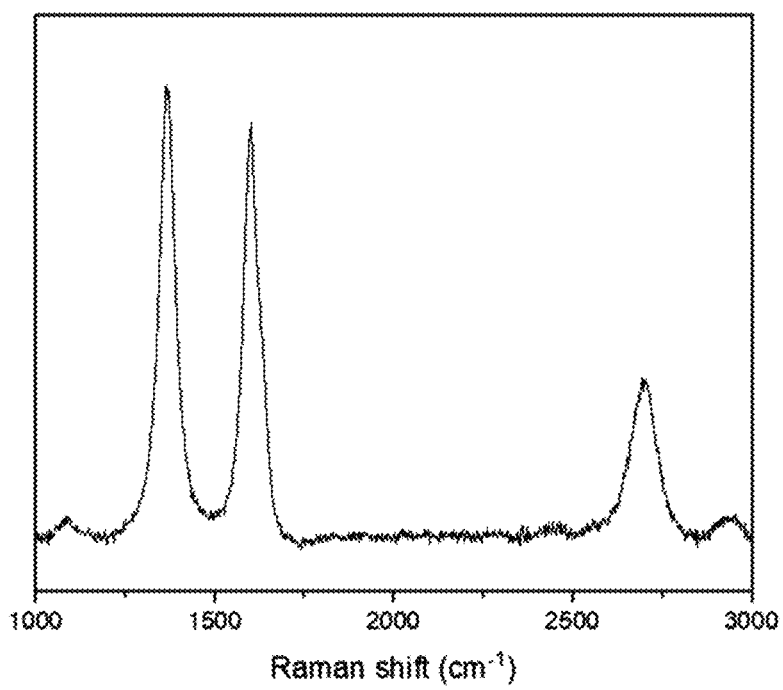
FIG. 15 shows a Raman spectroscopy of the exemplary carbon support used in Example 3.

In addition, Raman spectroscopy of the carbon support used in Example 3 was shown in FIG. 15.

As shown in FIGS. 14 and 15, the carbon support used in Example 3 had a specific surface area of 230 m²/g and an average pore diameter of 15.3 nm. In addition, the carbon support had an $I_d/I_g$ (I=band intensity @ Raman analysis, d=disordered/g=graphitized) ratio of 1.06, indicating that there were few defects.

Figure 16:
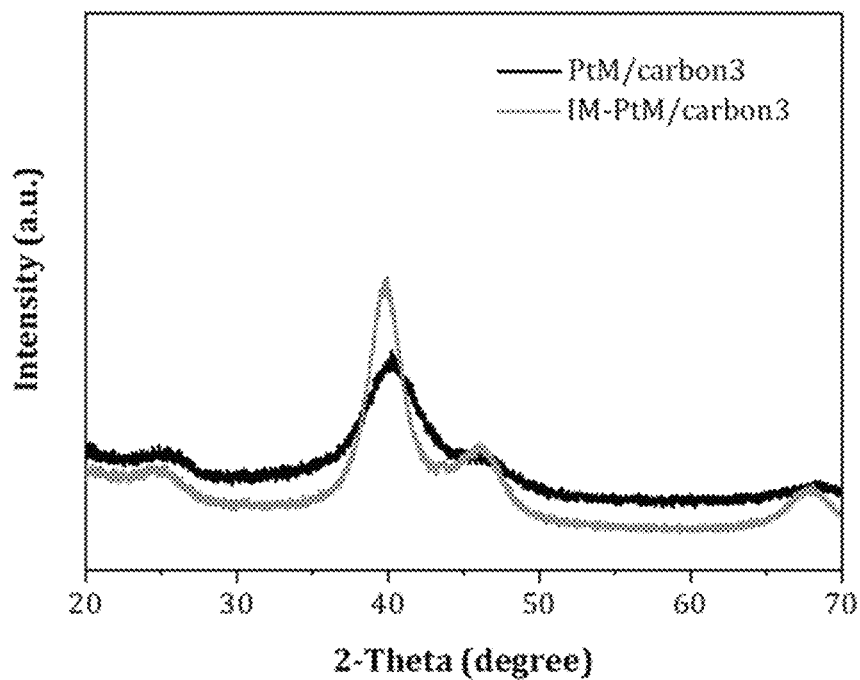
FIG. 16 shows a graph showing in-situ XRD analysis results of the exemplary alloy particles and intermetallic alloy particles prepared in Example 3.

The alloy particles and the intermetallic alloy particles manufactured in Example 3 were in-situ XRD analyzed, and the results are shown in FIG. 16.

Figure 17:
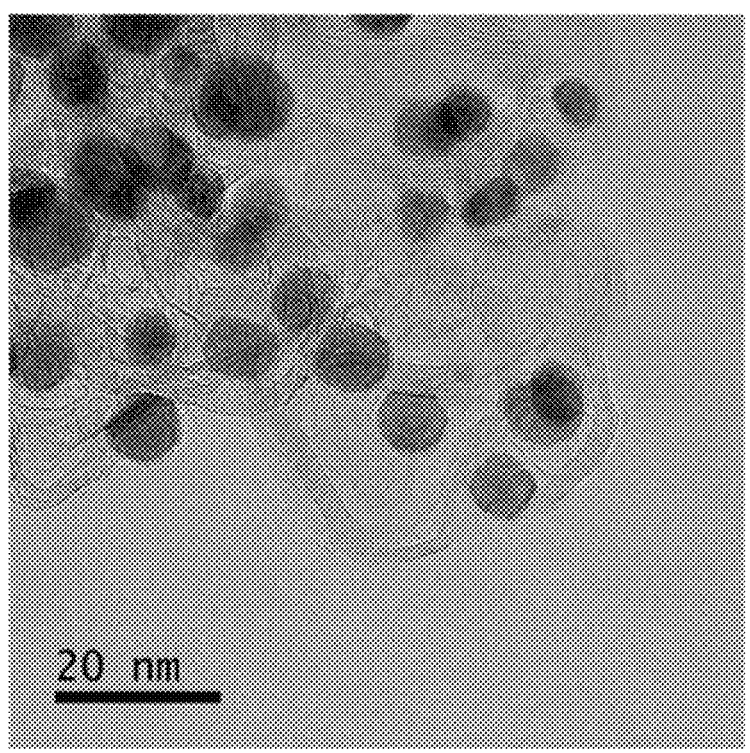
FIG. 17 shows a transmission electron micrograph (TEM) image of the exemplary intermetallic alloy particles prepared in Example 3.

In addition, a transmission electron microscope photograph (TEM) of the intermetallic alloy particles according to Example 3 is shown in FIG. 17.

As shown in FIGS. 16 and 17, the alloy particles manufactured by using a carbon support having a specific surface area of 230 m²/g and an average pore diameter of 15.3 nm had a size of 2.15 nm. Subsequently, the intermetallic alloy particles manufactured by teat-treating the alloy particles to transform them into an intermetallic structure under an atmosphere of 4% of hydrogen and 96% of air at a high temperature of 800° C. for 2 hours had a size up to 6.82 nm.

Figure 18:
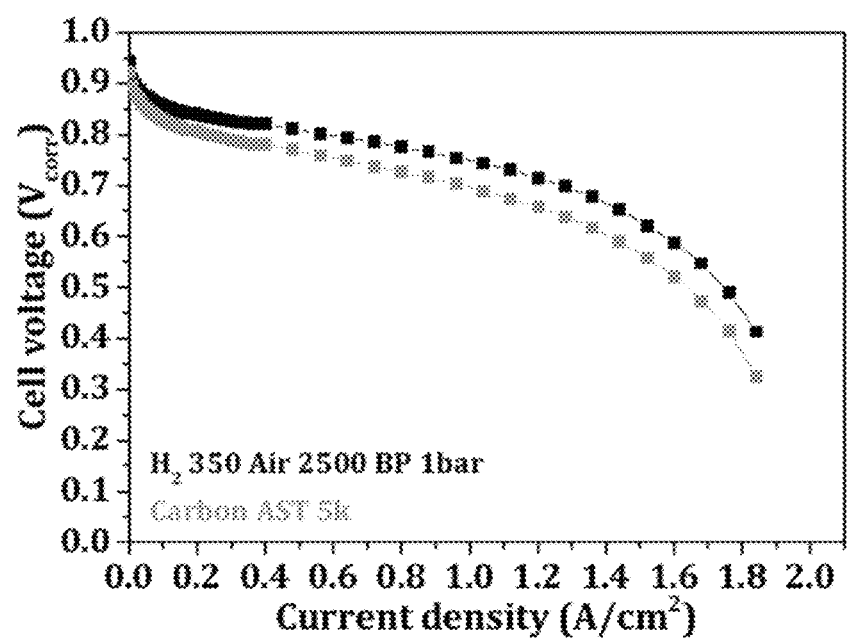
FIGS. 18 and 19 shows results of evaluating fuel cell performance of the exemplary intermetallic catalyst prepared in Example 3.
Figure 19:
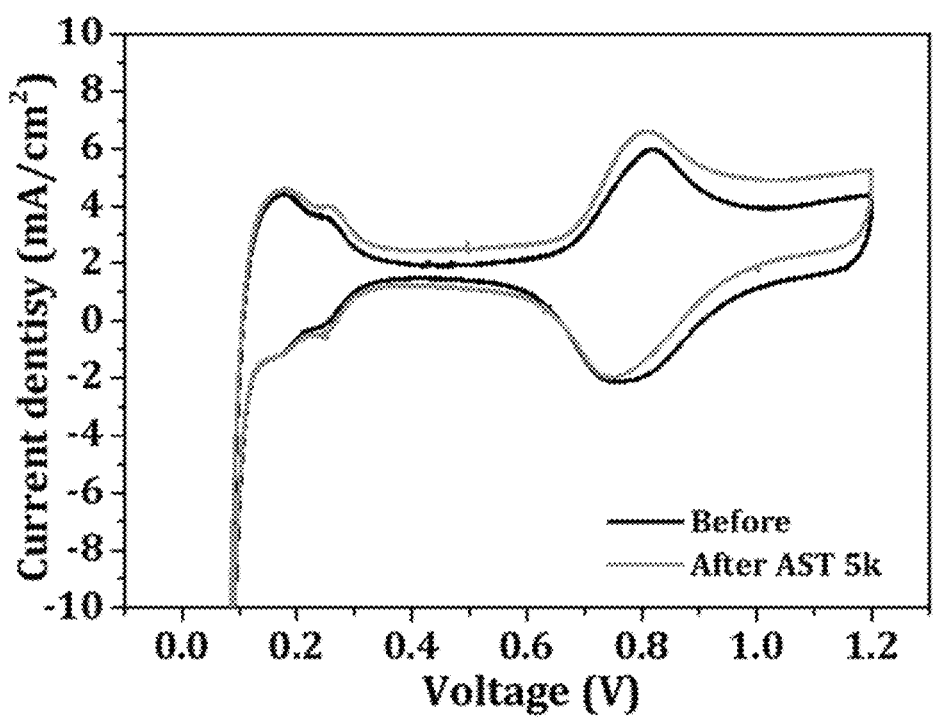

In addition, fuel cell performance of the intermetallic catalyst prepared in Example 3 was evaluated, and the result is shown in FIGS. 18 and 19 and summarized in Table 4.

TABLE 3

| $H_2$ 350 Air 2500 (BP 1 bar) | ECSA $m^2/g_{Pt}$ | OCV (V) | Current density @0.8 V (A/cm²) | Current density @0.7 V (A/cm²) | Current density @0.6 V (A/cm²) | HFR (mΩ · cm²) | Cell voltage @1.5 A/cm² (V) |
|---|---|---|---|---|---|---|---|
| Before | 37.8 | 0.939 | 0.619 | 1.332 | 1.650 | 64.7 | 661 |
| After AST 5k | 25.5 | 0.899 | 0.0392 | 0.1192 | 0.2192 | 46.9 | 0 |
| Retention | 67.4% | — | — | — | — | — | Δ 661 mV |

TABLE 4

| H₂ 350 Air 2500 (BP 1 bar) | ECSA $m^2/g_{Pt}$ | Current density @0.8 V (A/cm²) | Current density @0.7 V (A/cm²) | Current density @0.6 V (A/cm²) | HFR (mΩ · cm²) | Cell voltage @1.5 A/cm² (V) |
|---|---|---|---|---|---|---|
| Before | 25.9 | 0.579 | 1.267 | 1.572 | 57.4 | 0.634 |
| After AST 5k | 25.1 | 0.231 | 0.979 | 1.412 | 50.6 | 0.571 |
| Retention | 96.9% | 40% | 77% | 90% | | Δ 63 mV |

As shown in FIGS. 18 and 19 and Table 4, as an intermetallic alloy particle size increased, initial ECSA performance more decreased.

On the contrary, when a carbon support having a small specific surface area was introduced, crystallinity was higher, and defects became relatively less, and in the durability results of the carbon supports, performance was improved.

While this invention has been described in connection with what is presently considered to be various exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

101: carbon support
201: intermetallic alloy particle
202: alloy particle
210: noble metal
220: transition metal
230: protective layer

What is claimed is:

1. A method of preparing an intermetallic catalyst, comprising
    forming alloy particles in the pores of a carbon support, wherein the carbon support having an average pore size of about 6 nm to about 15 nm and a specific surface area of about 200 m²/g to about 2000 m²/g, and forming intermetallic alloy particles by annealing the alloy particles in the pores of the carbon support,
    wherein the alloy particles in the pores of the carbon support is formed by applying ultrasonic wave to a precursor mixture solution comprising a noble metal precursor, a transition metal precursor, and the carbon support.

2. The method of claim 1, wherein the intermetallic alloy particles have a size of about 3.0 nm to about 7.0 nm.

3. The method of claim 1, which further comprises preparing a second carbon support having an average pore size of about 8 nm to about 12 nm and a specific surface area of about 500 m²/g to about 700 m²/g, or a third carbon support having an average pore size of about 12 nm to about 15 nm and a specific surface area of about 200 m²/g to about 500 m²/g by annealing a first carbon support having an average pore size of about 6 nm to about 8 nm and a specific surface area of about 700 m²/g to about 2000 m²/g at about 800° C. to about 1200° C. for about 2 hours to about 10 hours.

4. The method of claim 1, wherein the noble metal precursor comprises one or more selected from the group consisting of platinum (Pt), ruthenium (Ru), osmium (Os), iridium (Ir), palladium (Pd), and an alloy thereof.

5. The method of claim 1, wherein the transition metal precursor comprises one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), and an alloy thereof.

6. The method of claim 1, wherein the carbon support comprises one or more selected from the group consisting of carbon black, graphite, a carbon nanofiber, a graphitized carbon nanofiber, a carbon nanotube, a carbon nanohorn, and a carbon nanowire.

7. The method of claim 1, wherein the ultrasonic wave is applied for about 20 minutes to about 4 hours at an output of about 125 W to about 200 W based on 100 mL of the precursor mixture solution.

8. The method of claim 1, wherein the annealing is performed at a temperature of about 700° C. to about 1200° C. for about 0.5 hours to about 16 hours.

9. The method of claim 1, wherein the annealing is performed under a gas atmosphere including hydrogen ($H_2$), and the gas comprises hydrogen ($H_2$) in an amount of about 1 volume % to about 10 volume % based on the total volume of the gas.

10. An intermetallic catalyst, comprising
    a carbon support having an average pore size of about 6 nm to about 15 nm and a specific surface area of about 200 m²/g to about 2000 m²/g, and
    intermetallic alloy particles comprising a transition metal and a noble metal wherein the intermetallic alloy particles are present in the pores of the carbon support and has a particle diameter of about 3.0 nm to about 7.0 nm.

11. The intermetallic catalyst of claim 10, wherein
    the carbon support comprises a first carbon support having an average pore size of about 6 nm to about 8 nm and a specific surface area may be about 700 m²/g to about 2000 m²/g, and
    the intermetallic alloy particles in the pores of the first carbon support have a size of about 3.0 nm to about 4.0 nm.

12. The intermetallic catalyst of claim 10, wherein
    the carbon support comprises a second carbon support having an average pore size of about 8 nm to about 12 nm and a specific surface area of about 500 m²/g to about 700 m²/g, and
    the intermetallic alloy particles in the pores of the second carbon support have a size of about 4.0 nm to about 5.0 nm.

13. The intermetallic catalyst of claim 10, wherein
    the carbon support comprises a third carbon support having an average pore size of about 12 nm to about 15 nm and a specific surface area of about 200 m²/g to about 500 m²/g, and
    the intermetallic alloy particles in the pores of the third carbon support have a size of about 6.0 nm to about 7.0 nm.

* * * * *